United States Patent
Gonzalez (10) Patent No.: US 8,346,723 B2
(45) Date of Patent: Jan. 1, 2013

(54) CONSOLIDATION OF PATCH TRANSFORMATIONS FOR DATABASE REPLICATION

(75) Inventor: Zandro Luis Gonzalez, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 245 days.

(21) Appl. No.: 12/749,799

(22) Filed: Mar. 30, 2010

(65) Prior Publication Data

US 2011/0246422 A1    Oct. 6, 2011

(51) Int. Cl.
*G06F 7/00* (2006.01)
*G06F 17/00* (2006.01)

(52) U.S. Cl. ........ 707/610; 707/611; 707/615; 707/638; 709/248

(58) Field of Classification Search .................. None
See application file for complete search history.

(56) References Cited

U.S. PATENT DOCUMENTS

| | | | | |
|---|---|---|---|---|
| 7,069,271 | B1 * | 6/2006 | Fadel et al. | 705/26.7 |
| 7,512,941 | B2 * | 3/2009 | Pan et al. | 717/173 |
| 7,809,763 | B2 * | 10/2010 | Nori et al. | 707/802 |
| 2006/0085465 | A1 * | 4/2006 | Nori et al. | 707/101 |
| 2008/0120536 | A1 * | 5/2008 | Osaka | 715/244 |
| 2009/0064123 | A1 * | 3/2009 | Ramesh et al. | 717/168 |
| 2010/0185701 | A1 * | 7/2010 | Ramamurthi et al. | 707/803 |
| 2010/0332526 | A1 * | 12/2010 | Nori et al. | 707/769 |
| 2011/0231831 | A1 * | 9/2011 | Smith et al. | 717/170 |

OTHER PUBLICATIONS

Kemian Dang, "Towards Heterogeneous Grid Database Replication", 2008, Master of Schience, School of Informatics University of Edinburgh, pp. 1-59.*

* cited by examiner

*Primary Examiner* — Angelica Ruiz
(74) *Attorney, Agent, or Firm* — Kilpatrick Townsend & Stockton LLP (57) ABSTRACT

Embodiments of the invention provide for applying modifications to database instances in a way that allows some of instances to be modified without requiring that all of the instances be modified. Patching less than all of a plurality of replicated database instances can comprise applying a patch to a first version of a table in a first database instance. The first version of the table may be replicated in a corresponding first version of the table in a second database instance. Applying the patch to the first version of the table in the first database instance can result in a second version of the table in the first database instance. Transformations caused by applying the patch to the first version of the table in the first database instance can be consolidated based on differences between the first version of the table and the second version of the table.

19 Claims, 6 Drawing Sheets

FIG. 6

CONSOLIDATION OF PATCH TRANSFORMATIONS FOR DATABASE REPLICATION

BACKGROUND OF THE INVENTION

Embodiments of the present invention relate generally to methods and systems for managing databases of information and more particularly to methods and systems for modifying replicated information in a plurality of database instances in a way that allows one or some of instances to be modified without requiring that all of the instances be correspondingly modified.

While some applications use a single instance database deployment model, other applications use a multi-instance database model. In the single database deployment model all data are stored within a single database instance. Alternatively, the data can be implemented in a plurality of database instances. In some cases, each database instance may represent a "pillar" used by one or more applications to store data. For example, an enterprise application may utilize one pillar representing and storing Customer Relationship Management (CRM) information and another pillar for financial information. However, such delineations are not always clear and in fact, some information necessarily crosses over between database instances. For example, a vendor or customer table may be used in both the CRM pillar and the financial pillar. Such a table used in multiple database instances needs to be periodically replicated, usually by a direct, one-to-one copy, between the instances in order to maintain consistency of the data therein.

Since some applications use many pillars and upgrading or modifying each pillar can be costly, users sometimes desire to only upgrade a single pillar. However, due to the pillar architecture, pillars still need to replicate data between themselves. There is then a problem of semantic inconsistency between the pillars and the source data needs to be patched on the fly as data is moved to the other target pillars whose versions may be different from each other. If many patches have been done on multiple target pillars, the replication system will have to deal with a combinatorial explosion of patches especially since intermediate state cannot be preserved. Therefore, pillar replication as of today deals only with same version pillars. That is, table T used in Pillar 1 can only be replicated to Pillar 2 if that pillar is of the same version as Pillar 1. Thus, there is no way to apply a patch or otherwise modify one or less than all of the pillars where replication is occurring between the pillars or instances of the database. Hence, there is a need for improved methods and systems for applying patches or modifications to a plurality of database instances.

BRIEF SUMMARY OF THE INVENTION

Embodiments of the invention provide systems and methods for applying patches or modifications to a plurality of database instances, such as two or more pillars, in a way that allows one or some of instances to be modified without requiring that all of the instances be correspondingly patched or modified. According to one embodiment, a method for patching less than all of a plurality of replicated database instances can comprise applying a patch to a first version of a table in a first database instance of the plurality of replicated database instances. The first version of the table may be replicated in a corresponding first version of the table in a second database instance of the plurality of replicated database instances. Applying the patch to the first version of the table in the first database instance can result in a second version of the table in the first database instance. Transformations caused by applying the patch to the first version of the table in the first database instance can be consolidated based on differences between the first version of the table in the first database instance and the second version of the table in the first database instance.

Consolidating transformations caused by applying the patch to the first version of the table can comprise identifying changes to one or more Data Manipulation Language (DML) statements between the first version of the table and the second version of the table, determining a statement type for each of the one or more DML statements in the second version of the table, and generating, based on the statement type, one or more consolidation queries for each of the one or more DML statements in the second version of the table. For example, the statement type can comprise an update type. In such a case, generating the one or more consolidation queries can comprise converting the update type statement to a corresponding merge type statement and converting the merge type statement to a select subquery wherein column data of the subquery is the same as column data of the target would be after application of the merge type statement. In another example, the statement type can comprise a merge type. In such a case, generating the one or more consolidation queries can comprise converting the merge type statement to a select subquery wherein column data of the subquery is the same as column data of the target would be after application of the merge type statement. In yet another example, the statement type can comprise an insert type and generating the one or more consolidation queries can comprise converting the insert type statement to a select subquery wherein column data of the subquery is the same as column data of the target would be after application of the insert type statement. In still another example, the statement type can comprise a delete type and generating the one or more consolidation queries can comprise converting the delete type statement to a select subquery wherein column data of the subquery is the same as column data of the target would be after application of the delete type statement.

A subsequent replication process can be performed between the first database instance and the second database instance. In this replication process, the second version of the table in the first database instance can be a source of the replication process and the first version of the table in the second database instance can be a target of the replication process. Performing the replication process can comprise executing the one or more consolidation queries. In some cases, a consolidation query table can be generated in the second database instance and the consolidation queries can be saved in the consolidation query table.

According to another embodiment, a system can comprise at least one data repository storing a plurality of replicated database instances. The plurality of replicated database instances can include at least a first version of a table in a first database instance and a corresponding, replicated first version of the table in a second database instance of the plurality of replicated database instances. The system can also include a computer communicatively coupled with the at least one data repository. The computer can execute instructions for patching less than all of the plurality of replicated database instances by causing the computer to apply a patch to the first version of the table in the first database instance. Applying the patch to the first version of the table in the first database instance can result in a second version of the table in the first database instance. Transformations caused by applying the patch to the first version of the table in the first database instance can be consolidated based on differences between the first version of the table in the first database instance and the second version of the table in the first database instance.

Consolidating transformations caused by applying the patch to the first version of the table can comprise identifying changes to one or more Data Manipulation Language (DML) statements between the first version of the table and the second version of the table, determining a statement type for each of the one or more DML statements in the second version of the table, and generating, based on the statement type, one or more consolidation queries for each of the one or more DML statements in the second version of the table. For example, the statement type can comprise an update type. In such a case, generating the one or more consolidation queries can comprise converting the update type statement to a corresponding merge type statement and converting the merge type statement to a select subquery wherein column data of the subquery is the same as column data of the target would be after application of the merge type statement. In another example, the statement type can comprise a merge type. In such a case, generating the one or more consolidation queries can comprise converting the merge type statement to a select subquery wherein column data of the subquery is the same as column data of the target would be after application of the merge type statement. In yet another example, the statement type can comprise an insert type and generating the one or more consolidation queries can comprise converting the insert type statement to a select subquery wherein column data of the subquery is the same as column data of the target would be after application of the insert type statement. In still another example, the statement type can comprise a delete type and generating the one or more consolidation queries can comprise converting the delete type statement to a select subquery wherein column data of the subquery is the same as column data of the target would be after application of the delete type statement.

A subsequent replication process can be performed between the first database instance and the second database instance. In this replication process, the second version of the table in the first database instance can be a source of the replication process and the first version of the table in the second database instance can be a target of the replication process. Performing the replication process can comprise executing the one or more consolidation queries. In some cases, a consolidation query table can be generated in the second database instance and the consolidation queries can be saved in the consolidation query table.

According to yet another embodiment, a machine-readable medium can have stored thereon a series of instructions which, when executed by a processor, cause the process to perform a method for patching less than all of a plurality of replicated database instances. The method can comprise applying a patch to a first version of a table in a first database instance of the plurality of replicated database instances, wherein the first version of the table is replicated in a corresponding first version of the table in a second database instance of the plurality of replicated database instances and wherein applying the patch to the first version of the table in the first database instance results in a second version of the table in the first database instance. Transformations caused by applying the patch to the first version of the table in the first database instance can be consolidated based on differences between the first version of the table in the first database instance and the second version of the table in the first database instance. Consolidating transformations caused by applying the patch to the first version of the table can comprise identifying changes to one or more Data Manipulation Language (DML) statements between the first version of the table and the second version of the table, determining a statement type for each of the one or more DML statements in the second version of the table, and generating based on the statement type one or more consolidation queries for each of the one or more DML statements in the second version of the table. The method can also include performing a replication process between the first database instance and the second database instance, wherein the second version of the table in the first database instance is a source of the replication process and the first version of the table in the second database instance is a target of the replication process. Performing the replication process can comprise executing the one or more consolidation queries.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for modifying replicated information in a plurality of database instances in a way that allows one or some of instances to be modified without requiring that all of the instances be correspondingly modified. More specifically, embodiments of the present invention provide for applying a patch or modification to a table or tables in a database instance, such as a pillar. Changes or transformation to Data Manipulation Language (DML) statements in the table caused by this modification can be identified and accommodated so that the modified table or new version thereof can be replicated in a corresponding table of another pillar even if the modifications or patch is not applied to that pillar. Generally speaking, this can be accomplished by identifying and converting the changes to the DML statements to one or more equivalent queries which can in turn be executed when subsequent replications are performed.

Stated another way, patching less than all of a plurality of replicated database instances can comprise applying a patch to a first version of a table in a first database instance of the plurality of replicated database instances. The first version of the table may be replicated in a corresponding first version of the table in a second database instance of the plurality of replicated database instances. Applying the patch to the first version of the table in the first database instance can result in a second version of the table in the first database instance. Transformations caused by applying the patch to the first version of the table in the first database instance can be consolidated based on differences between the first version of the table in the first database instance and the second version of the table in the first database instance.

Consolidating transformations caused by applying the patch to the first version of the table can comprise identifying changes to one or more Data Manipulation Language (DML) statements between the first version of the table and the second version of the table, determining a statement type for each of the one or more DML statements in the second version of the table, and generating, based on the statement type, one or more consolidation queries for each of the one or more DML statements in the second version of the table. For example, the statement type can comprise an update type. In such a case, generating the one or more consolidation queries can comprise converting the update type statement to a corresponding merge type statement and converting the merge type statement to a select subquery wherein column data of the subquery is the same as column data of the target would be after application of the merge type statement. In another example, the statement type can comprise a merge type. In such a case, generating the one or more consolidation queries can comprise converting the merge type statement to a select subquery wherein column data of the subquery is the same as column data of the target would be after application of the merge type statement. In yet another example, the statement type can comprise an insert type and generating the one or more consolidation queries can comprise converting the insert type statement to a select subquery wherein column data of the subquery is the same as column data of the target would be after application of the insert type statement. In still another example, the statement type can comprise a delete type and generating the one or more consolidation queries can comprise converting the delete type statement to a select subquery wherein column data of the subquery is the same as column data of the target would be after application of the delete type statement.

A subsequent replication process can be performed between the first database instance and the second database instance. In this replication process, the second version of the table in the first database instance can be a source of the replication process and the first version of the table in the second database instance can be a target of the replication process. Performing the replication process can comprise executing the one or more consolidation queries. In some cases, a consolidation query table can be generated in the second database instance and the consolidation queries can be saved in the consolidation query table. Various additional details of embodiments of the present invention will be described below with reference to the figures.

Figure 1:
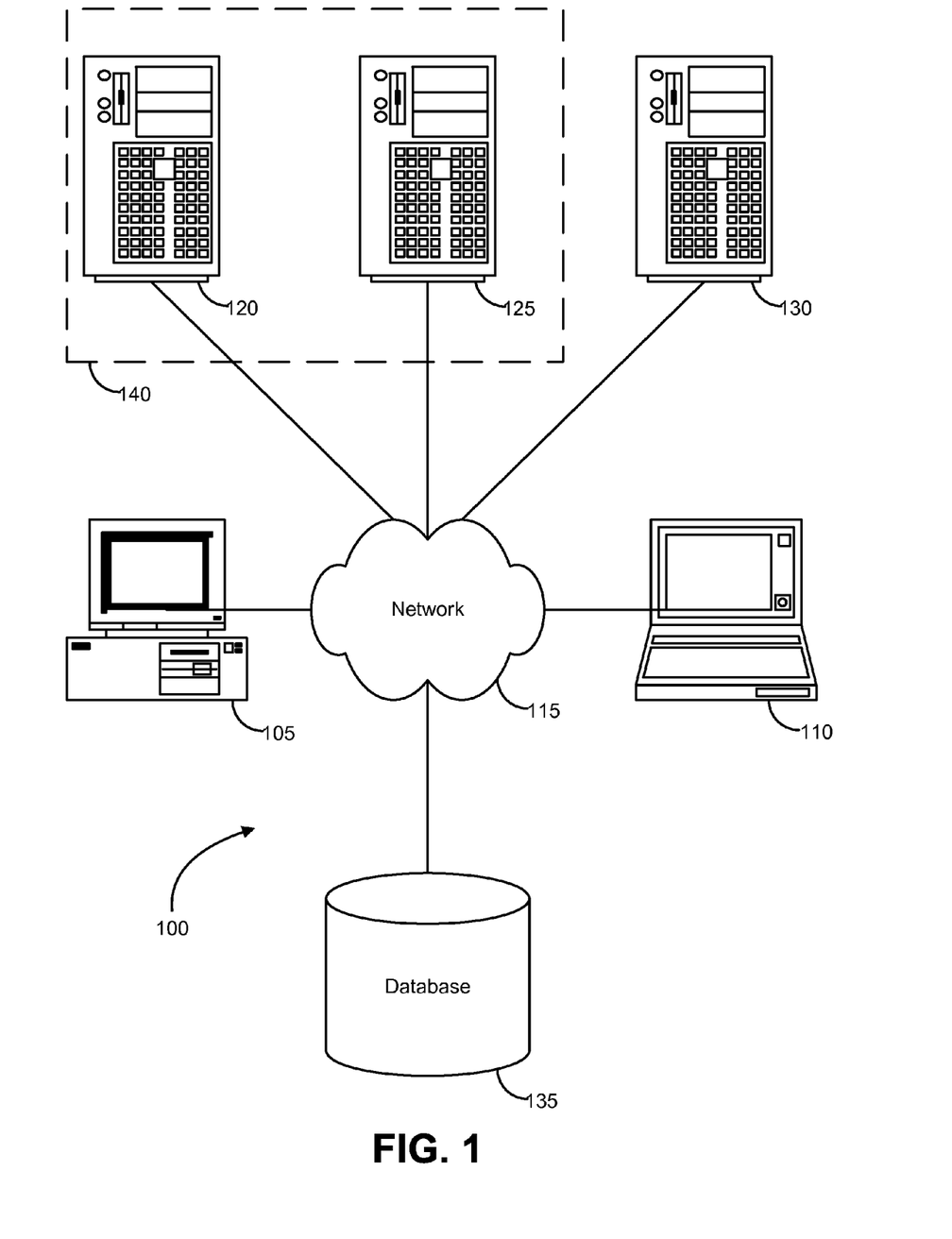
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
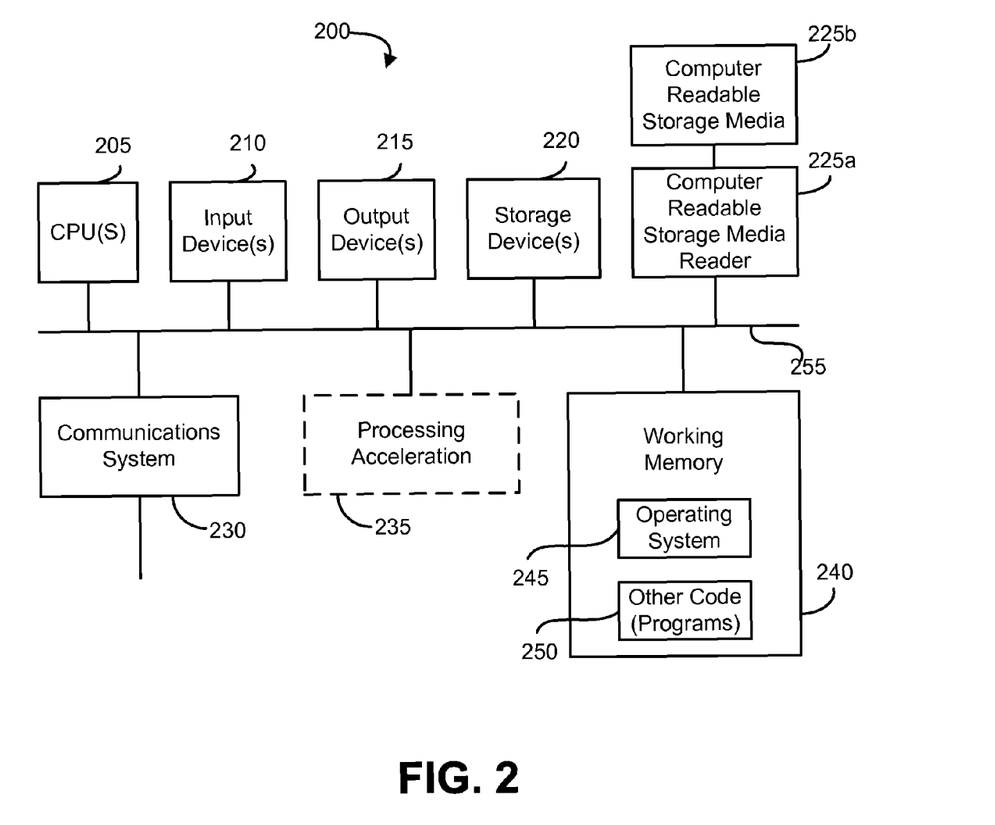
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
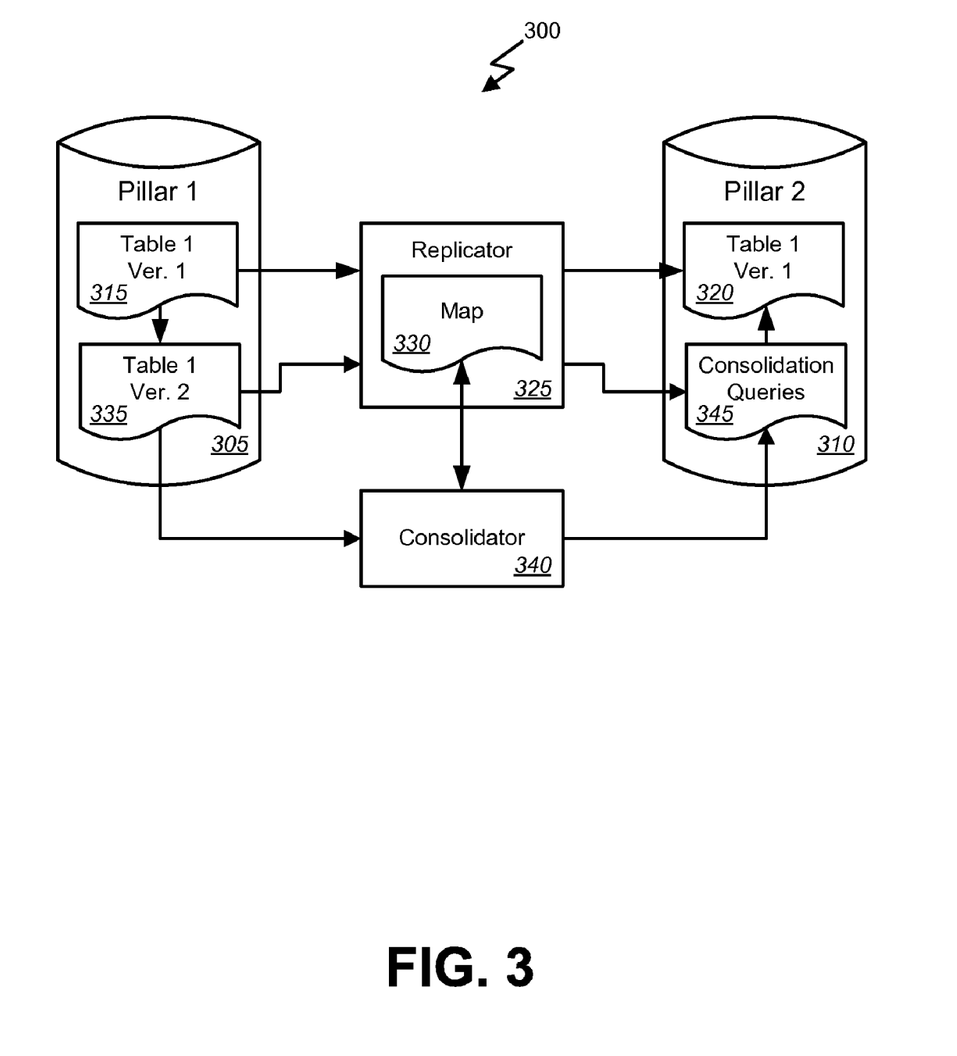
FIG. 3 is a block diagram illustrating, at a high-level, functional components of a system for applying patches or modifications to a plurality of database instances according to one embodiment of the present invention.

FIG. 3 is a block diagram illustrating, at a high-level, functional components of a system for applying patches or modifications to a plurality of database instances according to one embodiment of the present invention. This example illustrates a system 300 as may be implemented on one or more of the clients, servers, or other systems described above. Any one or more of such systems may execute software for modifying replicated information in a plurality of database instances in a way that allows one or some of instances to be modified without requiring that all of the instances be correspondingly modified.

More specifically, the system 300 as illustrated here can include at least one data repository storing a plurality of replicated database instances 305 and 310. It should be noted that, while replicated database instances 305 and 310 are illustrated here as separate, the instances may be implemented by and be stored in the same repository in any number of different repositories. Furthermore, while only two instances 305 and 310 are illustrated and described here for the sake of simplicity and clarity, embodiments of the present invention are not so limited and any number of instances may be utilized in actual implementations of the present invention. In some implementations, the plurality of replicated database instances 305 and 310 can represent "pillars" of information utilized by one or more applications (not shown here). However, it should be understood that such an implementation is not required and to any extent the description here refers to pillars, such a description is intended to be exemplary only. Thus, the term pillar as used herein should be considered to be with the definition of the term database instance.

Regardless of the exact implementation, the plurality of replicated database instances 305 and 310 can include at least a first version of a table 315 in a first database instance 305 and a corresponding, replicated first version of the table 320 in a second database instance 310. That is, the first version of a table 315 in the first database instance 305 can be replicated by a replicator module 325 of the system in the corresponding, replicated first version of the table 320 in the second database instance 310. As commonly understood, this replication can comprise a direct one-to one copy of the first version of the table 315 in the first database instance 305 to the corresponding, replicated first version of the table 320 in the second database instance 310 based on a map 330 used by the replicator module 325 to correlate the tables 315 and 320. It should be noted that while described here for the sake of simplicity and clarity as occurring in one direction, i.e., from the first database instance 305 to the second database instance 310, replication can also occur in both directions, i.e., also from the second database instance 310 to the first database instance 305.

As noted above, embodiments of the present invention provide for applying a patch or modification to a table or tables in one or some of the database instances without requiring the patch or modification to be applied to the corresponding tables in all of the database instances but in a way that maintains the ability of the system to perform replication between the corresponding tables. So for example, the system 300 can apply a modification to the first version of the table 315 in the first database instance 305 without requiring that the corresponding first version of the table 320 in the second database instance also be modified. To achieve this, the system 300 can apply a patch or modification (not shown here) to the first version of the table 315 in the first database instance 305. Applying the patch to the first version of the table 315 in the first database instance 305 can result in a second version of the table 335 in the first database instance 305. Changes or transformation to Data Manipulation Language (DML) statements in the table caused by this modification can be identified and accommodated so that the modified table or new version thereof can be replicated in a corresponding table of another pillar even if the modifications or patch is not applied to that pillar. Generally speaking, this can be accomplished by consolidating the transformations, i.e., identifying and converting the changes to the DML statements to one or more equivalent queries which can in turn be executed when subsequent replications are performed.

In other words, transformations caused by applying the patch to the first version of the table 315 in the first database instance 305 can be consolidated by consolidation module 340 based on differences between the first version of the table 315 in the first database instance 305 and the second version of the table 335 in the first database instance 305. Consolidating transformations caused by applying the patch to the first version of the table 315 can comprise identifying changes to one or more DML statements between the first version of the table 315 and the second version of the table 335, determining a statement type for each of the one or more DML statements in the second version of the table 335, and generating, based on the statement type, one or more consolidation queries for each of the one or more DML statements in the second version of the table 335. In some cases, a consolidation query table 345 can be generated, for example in the second database instance 310 or perhaps elsewhere, and the consolidation queries can be saved in the consolidation query table 345. Additional details of an exemplary consolidation process as may be performed by consolidation module 340 will be described below with reference to FIG. 5

A subsequent replication process can be performed by the replicator module 325 between the first database instance 305 and the second database instance 310. In this replication process, the second version of the table 335 in the first database instance 305 can be a source of the replication process and the first version of the table 320 in the second database instance 310 can be a target of the replication process. Performing the replication process can comprise the replicator module 325 executing the one or more consolidation queries 345. Additional details of an exemplary replication process according to embodiments of the present invention will be described below with reference to FIG. 6.

Figure 4:
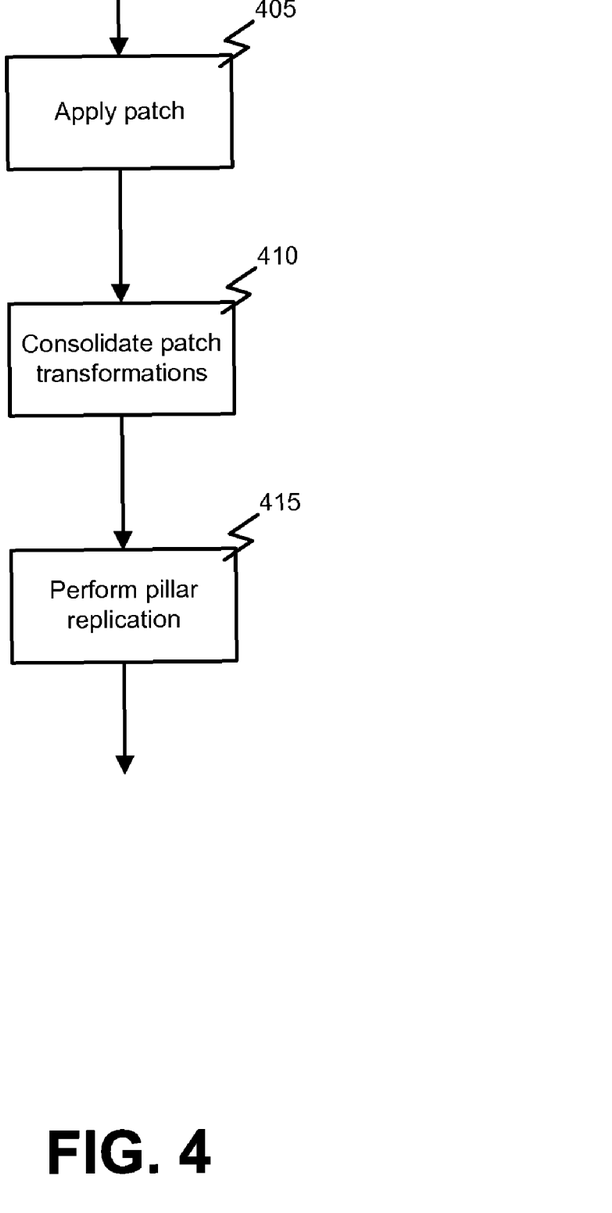
FIG. 4 is a flowchart illustrating a process for applying patches or modifications to a plurality of database instances according to one embodiment of the present invention.

FIG. 4 is a flowchart illustrating a process for applying patches or modifications to a plurality of database instances according to one embodiment of the present invention. In this example, the process begins with applying 405 a patch to a first version of a table in a first database instance of a plurality of replicated database instances. Applying 405 the patch or modification can be performed in any of a variety of ways as noted above. Also as noted above, the first version of the table may be replicated in a corresponding first version of the table in a second database instance of the plurality of replicated database instances. Applying 405 the patch to the first version of the table in the first database instance can result in a second version of the table in the first database instance but does not need to modify the corresponding first version of the table in the second database instance.

Transformations caused by applying 405 the patch to the first version of the table in the first database instance can be consolidated 410 based on differences between the first version of the table in the first database instance and the second version of the table in the first database instance. Generally speaking, consolidating the transformations can comprise identifying and converting changes to DML statements in the modified table to one or more equivalent queries. Additional details of an exemplary process for consolidating transformations, as well as several illustrative examples thereof, will be described below with reference to FIG. 5.

Subsequently, a replication process can be performed 415 between the new, modified version of the table in the first database instance and the original corresponding, and unmodified, table in the second database instance. Generally speaking, this can be accomplished based on the generated queries which can in turn be executed when replications are performed. Additional details of an exemplary process for replication based on consolidated transformation according to embodiments of the present invention will be described below with reference to FIG. 6.

Figure 5:
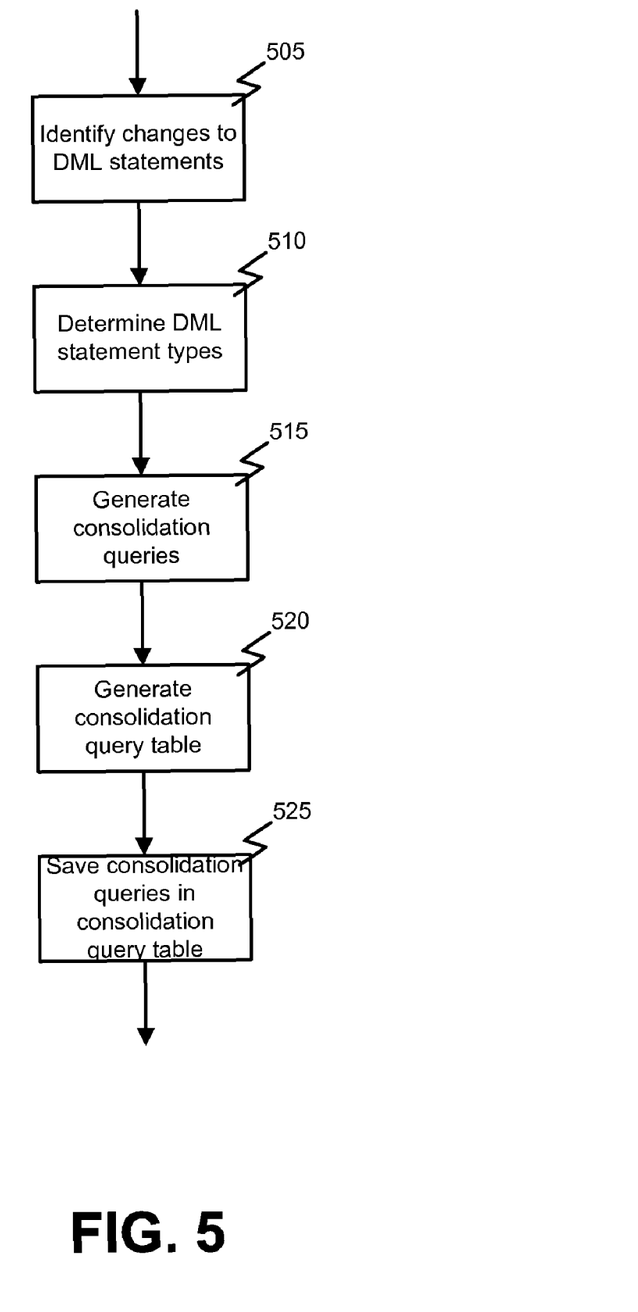
FIG. 5 is a flowchart illustrating additional details of a process for consolidating transformations of a modification according to one embodiment of the present invention.

FIG. 5 is a flowchart illustrating additional details of a process for consolidating transformations of a modification according to one embodiment of the present invention. In this example, the process can begin with identifying 505 changes to one or more Data Manipulation Language (DML) statements between the first version of the table and the second version of the table. A statement type can be determined 510 for each of the one or more DML statements in the second version of the table. These statement types can include, for example, an update type, a merge type, an insert type, and/or a delete type. One or more consolidation queries can be generated 515 for each of the one or more identified DML statements in the second version of the table and based on the statement type. In some cases, a new consolidation query table may be generated 520, for example in the second database instance, and the generated queries can be saved 525 in the consolidation query table for use in subsequent replication operations.

As noted, the statement type can comprise an update type. In such a case, generating the one or more consolidation queries can comprise converting the update type statement to a corresponding merge type statement and converting the merge type statement to a select subquery wherein column data of the subquery is the same as column data of the target would be after application of the merge type statement. That is, the functionality of a merge statement can be considered a superset of the functionality provided by an update statement. Therefore, these transformations can be converted into their corresponding merge statements used to generate corresponding queries. For example:

```
UPDATE T SET LNAME = (SELECT NAME FROM B WHERE B.X = T.Y)
WHERE ID > 10
```

Can be transformed into:

```
MERGE INTO T USING (SELECT ID, LNAME FROM T WHERE
ID > 10)
SQ ON (T.ID = SQ.ID)
WHEN MATCHED THEN UPDATE SET NAME = (SELECT NAME
FROM B WHERE B.X = SQ.Y)
```

Note that in order to transform an update statement, the updated table should have a primary key. For this example, it is assumed that the primary key is defined on T and is column ID.

The statement type can comprise a merge type. In such a case, generating the one or more consolidation queries can comprise converting the merge type statement to a select subquery wherein column data of the subquery is the same as column data of the target would be after application of the merge type statement. For example:

```
MERGE INTO T USING (SELECT ID, FNAME, LNAME FROM B) ON
(T.ID = SQ.ID)
WHEN MATCHED THEN UPDATE SET FNAME =
UPPER(SQ.NAME)
WHEN UNMATCHED THEN INSERT (T.ID, T.FNAME, T.LNAME)
VALUES (SQ.ID, SQ.FNAME, SQ.LNAME)
```

Can be transformed to:

```
SELECT SQ.ID, UPPER(SQ.FNAME) FNAME, SQ.LNAME FROM T,
(SELECT ID, FNAME, LNAME FROM B) SQ WHERE SQ.ID = T.ID
UNION ALL
SELECT SQ.ID, SQ.FNAME, SQ.LNAME FROM T, (SELECT ID,
FNAME, LNAME FROM B) SQ WHERE NOT(SQ.ID = T.ID)
UNION ALL
SELECT T.ID, T.FNAME, T.LNAME FROM T, (SELECT ID, FNAME,
LNAME FROM B) SQ WHERE NOT(SQ.ID = T.ID)
```

In another example:

```
MERGE INTO T USING (SELECT ID, FNAME FROM B)
ON (T.ID = SQ.ID)
WHEN MATCHED THEN UPDATE SET FNAME =
UPPER(SQ.NAME)
```

Can be transformed to:

```
SELECT SQ.ID, UPPER(SQ.FNAME) FNAME FROM T, (SELECT ID,
FNAME FROM B) SQ WHERE SQ.ID = T.ID
UNION ALL
SELECT T.ID, T.FNAME FROM T, (SELECT ID, FNAME FROM B)
SQ
WHERE NOT(SQ.ID = T.ID)
```

The statement type can comprise an insert type and generating the one or more consolidation queries can comprise converting the insert type statement to a select subquery wherein column data of the subquery is the same as column data of the target would be after application of the insert type statement. For example:

```
INSERT INTO T (ID, FNAME, LNAME)
SELECT ID, FNAME, LNAME FROM B WHERE ID < 10
```

Can be transformed into:

```
SELECT ID, FNAME, LNAME FROM T
UNION ALL
SELECT ID, FNAME, LNAME FROM B WHERE ID < 10
```

Figure 6:
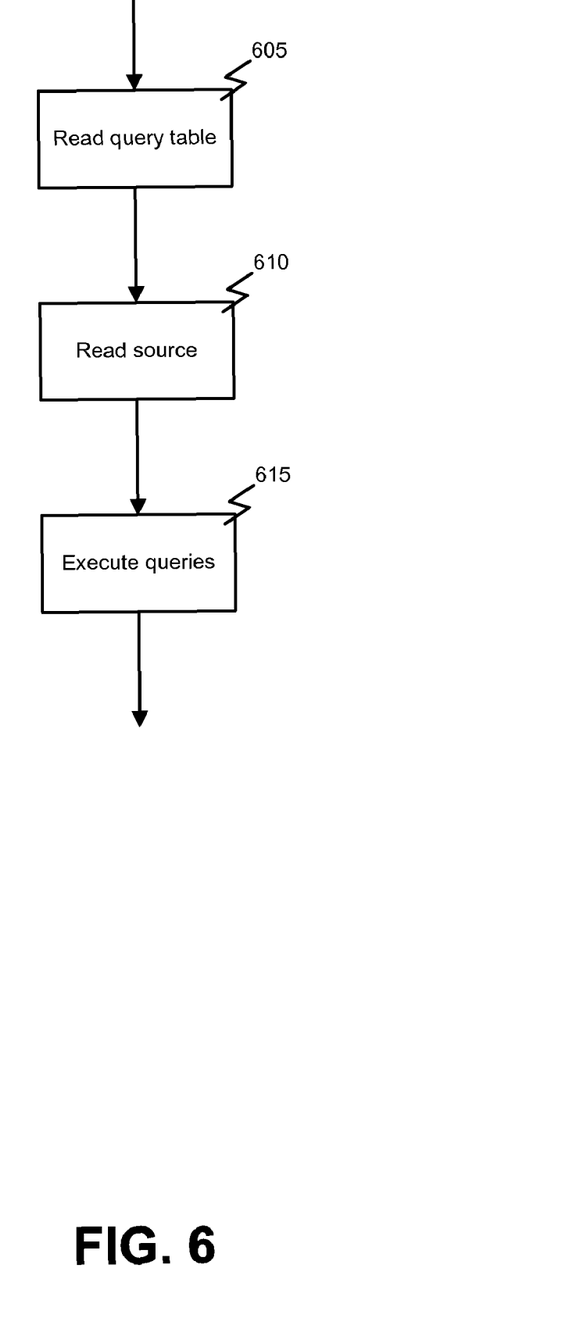
FIG. 6 is a flowchart illustrating additional details of performing a replication process according to one embodiment of the present invention.

The statement type can comprise a delete type and generating the one or more consolidation queries can comprise converting the delete type statement to a select subquery wherein column data of the subquery is the same as column data of the target would be after application of the delete type statement. For example:
DELETE FROM T WHERE C1='C1VALUE'
Can be transformed into:
SELECT C1 FROM T WHERE NOT (C1='C1VALUE')
FIG. 6 is a flowchart illustrating additional details of performing a replication process according to one embodiment of the present invention. As noted above, a replication process performed subsequent to consolidating transformation as described here can be performed between the first database instance and the second database instance based on the generated and saved queries. In this replication process, the second version of the table in the first database instance can be a source of the replication process and the first version of the table in the second database instance can be a target of the replication process. As illustrated in this example, processing can begin with reading 605 the consolidation queries from the consolidation query table. The source table for the replication can also be read 610. The one or more consolidation queries can then be executed 615 on the source and target tables to affect the replication.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for patching less than all of a plurality of replicated database instances, the method comprising:
    applying, by a computer system, a patch to a first version of a table in a first database instance of the plurality of replicated database instances, wherein the first version of the table is replicated in a corresponding first version of the table in a second database instance of the plurality of replicated database instances and wherein applying the patch to the first version of the table in the first database instance results in a second version of the table in the first database instance;
    consolidating, by the computer system, transformations caused by applying the patch to the first version of the table in the first database instance based on differences between the first version of the table in the first database instance and the second version of the table in the first database instance; and
    performing, by the computer system, a replication process between the first database instance and the second database instance, wherein the second version of the table in the first database instance is a source of the replication process and the first version of the table in the second database instance is a target of the replication process, wherein the replication process applies the consolidated transformations to the table in the second database instance without applying the patch to the second database instance.

2. The method of claim 1, wherein consolidating transformations caused by applying the patch to the first version of the table comprises:
    identifying changes to one or more Data Manipulation Language (DML) statements between the first version of the table and the second version of the table;
    determining a statement type for each of the one or more DML statements in the second version of the table; and
    generating based on the statement type one or more consolidation queries for each of the one or more DML statements in the second version of the table.

3. The method of claim 2, wherein performing the replication process comprises executing the one or more consolidation queries.

4. The method of claim 3, further comprising:
    generating, by the computer system, a consolidation query table in the second database instance; and
    saving, by the computer system, the consolidation queries in the consolidation query table.

5. The method of claim 3, wherein the statement type comprises an update type and wherein generating the one or more consolidation queries comprises converting the update type statement to a corresponding merge type statement and converting the merge type statement to a select subquery wherein column data of the subquery is the same as column data of the target would be after application of the merge type statement.

6. The method of claim 3, wherein the statement type comprises a merge type and wherein generating the one or more consolidation queries comprises converting the merge type statement to a select subquery wherein column data of the subquery is the same as column data of the target would be after application of the merge type statement.

7. The method of claim 3, wherein the statement type comprises an insert type and wherein generating the one or more consolidation queries comprises converting the insert type statement to a select subquery wherein column data of the subquery is the same as column data of the target would be after application of the insert type statement.

8. The method of claim 3, wherein the statement type comprises a delete type and wherein generating the one or more consolidation queries comprises converting the delete type statement to a select subquery wherein column data of the subquery is the same as column data of the target would be after application of the delete type statement.

9. A system comprising:
    at least one data repository storing a plurality of replicated database instances including at least a first version of a table in a first database instance and a corresponding, replicated first version of the table in a second database instance of the plurality of replicated database instances and; and
    a computer communicatively coupled with the at least one data repository and executing instructions for patching less than all of the plurality of replicated database instances, wherein the instruction cause the computer to apply a patch to the first version of the table in the first database instance, wherein applying the patch to the first version of the table in the first database instance results in a second version of the table in the first database instance, and wherein the instructions further cause the computer to consolidate transformations caused by applying the patch to the first version of the table in the first database instance based on differences between the first version of the table in the first database instance and the second version of the table in the first database instance and perform a replication process between the first database instance and the second database instance, wherein the second version of the table in the first database instance is a source of the replication process and the first version of the table in the second database instance is a target of the replication process, wherein the replication process, wherein the replication process applies the consolidated transformations to the table in the second database instance without applying the patch to the second database instance.

10. The system of claim 9, wherein consolidating transformations caused by applying the patch to the first version of the table comprises:
   identifying changes to one or more Data Manipulation Language (DML) statements between the first version of the table and the second version of the table;
   determining a statement type for each of the one or more DML statements in the second version of the table; and
   generating based on the statement type one or more consolidation queries for each of the one or more DML statements in the second version of the table.

11. The system of claim 10, wherein performing the replication process comprises executing the one or more consolidation queries.

12. The system of claim 11, wherein the instructions further cause the computer to generate a consolidation query table in the second database instance and save the consolidation queries in the consolidation query table.

13. The system of claim 11, wherein the statement type comprises an update type and wherein generating the one or more consolidation queries comprises converting the update type statement to a corresponding merge type statement and converting the merge type statement to a select subquery wherein column data of the subquery is the same as column data of the target would be after application of the merge type statement.

14. The system of claim 11, wherein the statement type comprises a merge type and wherein generating the one or more consolidation queries comprises converting the merge type statement to a select subquery wherein column data of the subquery is the same as column data of the target would be after application of the merge type statement.

15. The system of claim 11, wherein the statement type comprises an insert type and wherein generating the one or more consolidation queries comprises converting the insert type statement to a select subquery wherein column data of the subquery is the same as column data of the target would be after application of the insert type statement.

16. The system of claim 11, wherein the statement type comprises a delete type and wherein generating the one or more consolidation queries comprises converting the delete type statement to a select subquery wherein column data of the subquery is the same as column data of the target would be after application of the delete type statement.

17. A machine-readable memory having stored thereon a series of instructions which, when executed by a processor, cause the process to perform a method for patching less than all of a plurality of replicated database instances, the method comprising:
   applying a patch to a first version of a table in a first database instance of the plurality of replicated database instances, wherein the first version of the table is replicated in a corresponding first version of the table in a second database instance of the plurality of replicated database instances and wherein applying the patch to the first version of the table in the first database instance results in a second version of the table in the first database instance;
   consolidating transformations caused by applying the patch to the first version of the table in the first database instance based on differences between the first version of the table in the first database instance and the second version of the table in the first database instance; and
   performing a replication process between the first database instance and the second database instance, wherein the second version of the table in the first database instance is a source of the replication process and the first version of the table in the second database instance is a target of the replication process, wherein the replication process, wherein the replication process applies the consolidated transformations to the table in the second database instance without applying the patch to the second database instance.

18. The machine-readable memory of claim 17, wherein consolidating transformations caused by applying the patch to the first version of the table comprises:
   identifying changes to one or more Data Manipulation Language (DML) statements between the first version of the table and the second version of the table;
   determining a statement type for each of the one or more DML statements in the second version of the table; and
   generating based on the statement type one or more consolidation queries for each of the one or more DML statements in the second version of the table.

19. The machine-readable memory of claim 18, wherein performing the replication process comprises executing the one or more consolidation queries.

* * * * *

UNITED STATES PATENT AND TRADEMARK OFFICE
CERTIFICATE OF CORRECTION

PATENT NO.           : 8,346,723 B2                                                              Page 1 of 1
APPLICATION NO.      : 12/749799
DATED                : January 1, 2013
INVENTOR(S)          : Gonzalez It is certified that error appears in the above-identified patent and that said Letters Patent is hereby corrected as shown below:

On Title page, (56) References Cited in column 2, under "Other Publications", line 2, delete "Schience," and insert -- Science, --, therefor.

In column 10, line 24, delete "FIG. 5" and insert -- FIG. 5. --, therefor.

In column 11, line 38, delete "WHEREB.X" and insert -- WHERE B.X --, therefor.

In column 14, line 51-52, in Claim 9, delete "instances and; and" and insert -- instances; and --, therefor.

In column 15, line 5-6, in Claim 9, after "process," delete "wherein the replication process,".

Signed and Sealed this
Ninth Day of April, 2013

Teresa Stanek Rea
*Acting Director of the United States Patent and Trademark Office*